S. MUNSON.
HEADLIGHT DIMMER.
APPLICATION FILED APR. 28, 1919.
1,360,138.
Patented Nov. 23, 1920.
2 SHEETS—SHEET 1.
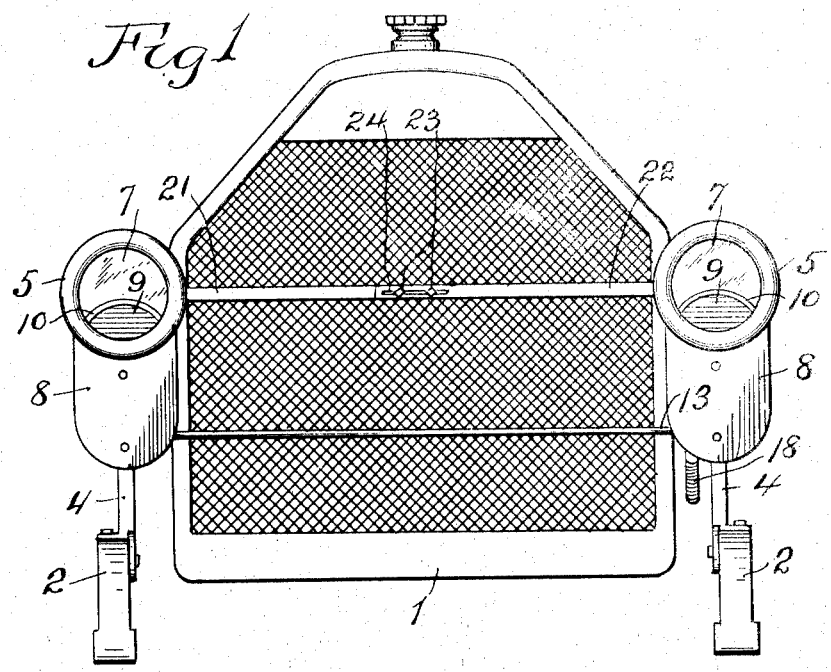
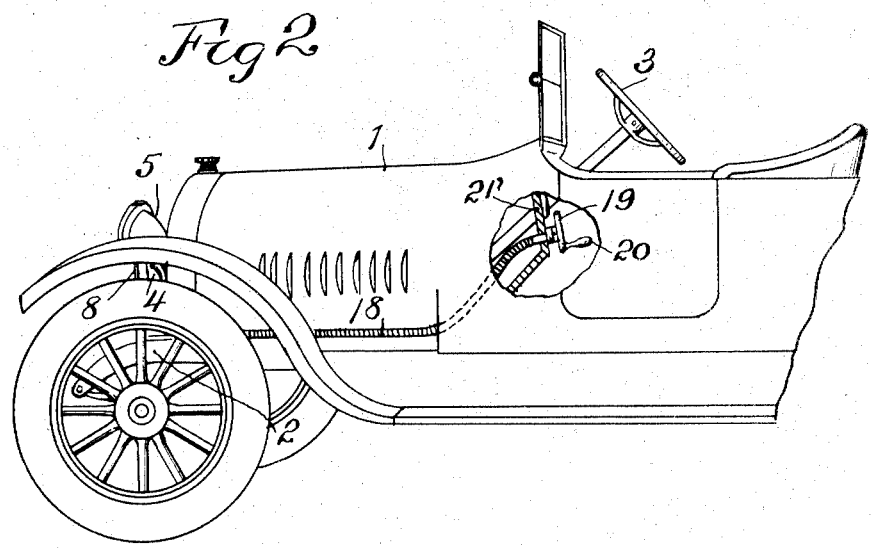

S. MUNSON.
HEADLIGHT DIMMER.
APPLICATION FILED APR. 28, 1919.
1,360,138.
Patented Nov. 23, 1920.
2 SHEETS—SHEET 2.
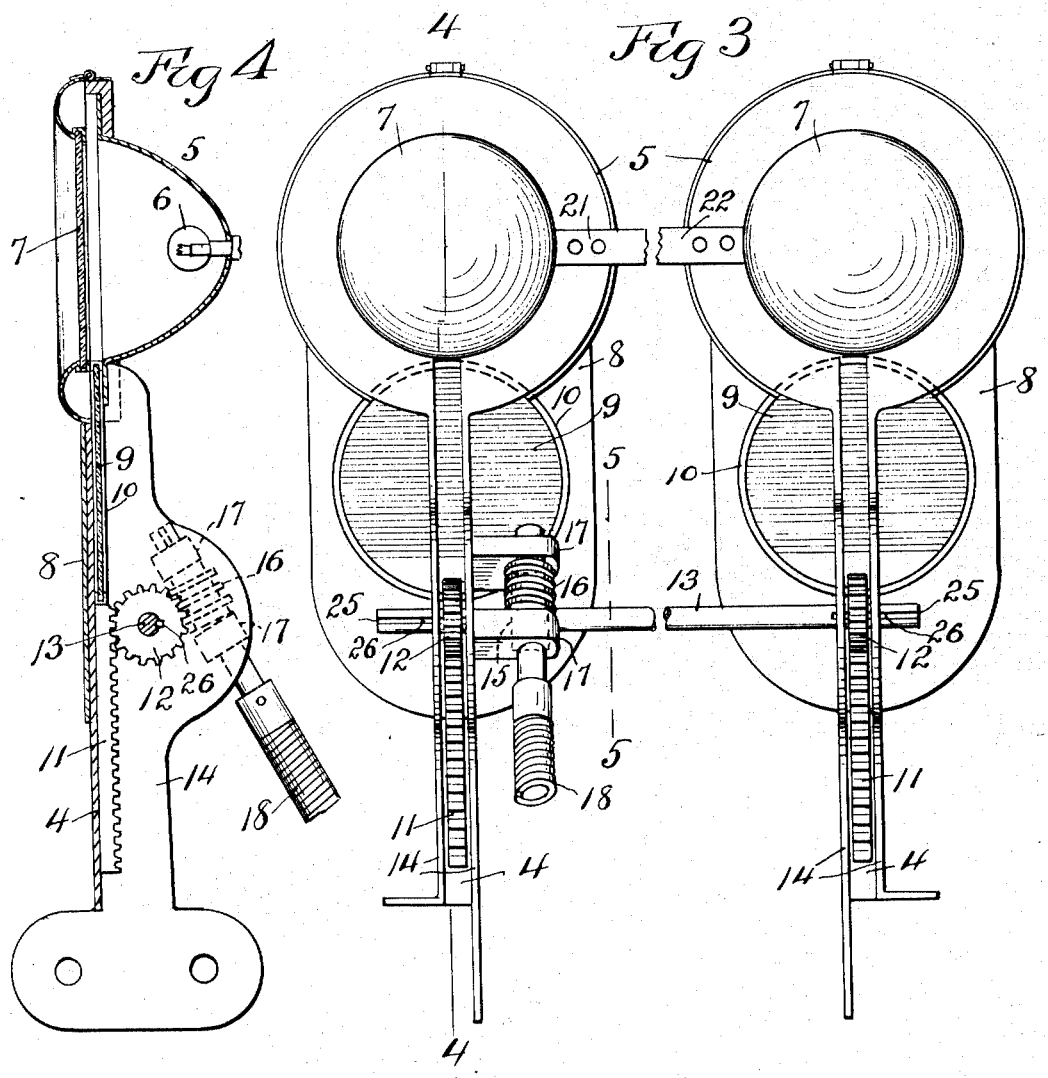
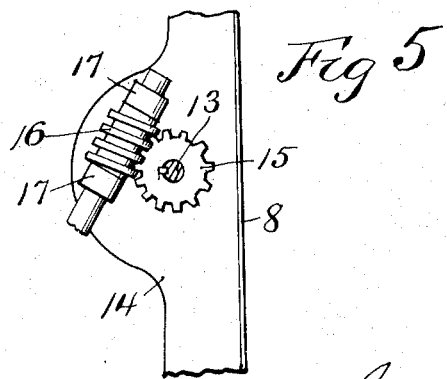
Witness:
R. E. Hamilton
Inventor
Sweney Munson
By Warren D. House,
His Attorney

UNITED STATES PATENT OFFICE.

SWENEY MUNSON, OF FOWLER, COLORADO.

HEADLIGHT-DIMMER.

1,360,138.  Specification of Letters Patent.  Patented Nov. 23, 1920.

Application filed April 28, 1919. Serial No. 293,144.

*To all whom it may concern:*

Be it known that I, SWENEY MUNSON, a citizen of the United States, residing at Fowler, in the county of Otero and State of Colorado, have invented a certain new and useful Improvement in Headlight-Dimmers, of which the following is a specification.

My invention relates to improvements in headlight dimmers.

One of the objects of my invention is to provide novel means operable by an operator of an automobile when at the steering wheel for dimming and undimming the headlight or lights at one end of the machine.

My invention provides further novel means for dimming the light of a headlight, which is simple in construction, cheap to manufacture, durable and not liable to get out of order, and which is efficient in operation.

Other novel features of my invention are hereinafter fully described and claimed.

In the accompanying drawings, which illustrate the preferred embodiment of my invention, Figure 1 is a front elevation of a part of an automobile provided with my improvement.

Fig. 2 is a side elevation, partly broken away, of an automobile having my improvement.

Fig. 3 is an enlarged back elevation, partly broken away, of two headlights, and the mechanism for dimming the same.

Fig. 4 is a vertical sectional view on the line 4—4 of Fig. 3.

Fig. 5 is a vertical sectional view on the line 5—5 of Fig. 3.

Similar reference characters designate similar parts in the different views.

1 designates the body of an ordinary automobile, 2 the frame which supports the same and 3 the steering wheel.

Secured rigidly at their lower ends to the frame 2 at opposite sides of the body 1 adjacent to the lower end thereof, are two vertical brackets 4, to the upper ends of which are rigidly secured two headlights 5, of the usual type, each provided with a lamp 6 and the usual glass cover plate 7.

Depending respectively from the headlights 5 are two vertical guard plates 8, to the rear of which are respectively disposed two dimming members, each comprising, preferably, a frosted or ground glass plate 9, mounted in a supporting ring 10 which embraces the periphery of the glass plate 9.

Respectively secured to the lower edges of the rings 10 are two vertical racks 11 which respectively mesh with two pinions 12 which are secured to and rotatable with a horizontal shaft 13. The brackets 4 are preferably channels, each having side flanges 14, between which the adjacent rack 11 is vertically slidable and through which the shaft 13 extends.

As shown in Fig. 5, the shaft 13 has mounted on and rotatable with it a worm wheel 15 which meshes with a worm 16 rotatably mounted in bearings 17 which extend inwardly from the adjacent flange 14 of the adjacent bracket 4.

A flexible shaft 18 is attached at one end to one end of the worm 16, its other end being attached to a wheel 19, Fig. 2, provided with a crank 20, by which the operator of with a crank 20, by which the operator of the machine while at the steering wheel 3 can rotate the wheel 19 and flexible shaft 18 for the purpose of vertically moving the dimming members 9 through the intermediacy of the racks 11, pinions 12, shaft 13, worm wheel 15 and worm 16.

The shaft 18 extends through the dash board 21' of the automobile at a point adjacent to the steering wheel 3, so that the operator of the machine, while having hold of the steering wheel can operate the crank wheel 19 for raising simultaneously or lowering the dimming members 9. By turning the crank wheel 19 in the proper direction, the dimming members 9 may be moved upwardly from the lowered position shown in Fig. 3 and Fig. 4 to positions intermediate of the lamps 6 and the glass plates 7, in which positions the light thrown from the lamps 6 will be intercepted and dimmed. By reversing the direction of turning of the crank wheel 19, the dimming members 9 may be lowered so as not to intercept the light from the lamps 6. By utilizing a worm and worm wheel as a part of the transmission means between the shaft 13 and the crank wheel 19, the dimming members will be releasably locked in the positions to which they may be adjusted, and they can not be disturbed in position by jarring or jolting of the car.

For bracing the headlights, they have respectively secured to them two horizontal brace bars 21 and 22 which overlap each other, the bar 21 having mounted in it two bolts 23 which extend through a longitudinal slot 24 in the bar 22, as shown in Fig. 1. By loosening the bolts 23, which clamp the bars 21 and 22 together, the bars may be longitudinally adjusted so as to space the headlights 5 the required distance apart. To permit of this adjustment, the shaft 13 is of sufficient length so as to permit of the lateral adjustment of the brackets 4 to suit the distance between the front portions of the frame 2. The shaft 13 is provided at each end with a longitudinal key way 25 for receiving a key 26 which engages the adjacent pinion 12.

I do not limit my invention to the structure shown and described, as modifications, within the scope of the appended claim, may be made without departing from the spirit of my invention.

What I claim is:—

In a headlight dimmer, a pair of head lamps, vertical guide plates depending from said lamps, brackets supporting said lamps and having guide channels located centrally with respect to the guide plates, dimmer members slidable between the guide plates and the foreparts of the lamps to intercept light when projected from the latter, racks on the dimmer members and movable in the guide channels, rack gears journaled in the brackets and meshing with the racks, a shaft connecting the rack gears together, and a flexible actuating shaft having a worm terminal meshing with one of the rack gears, substantially and for the purpose specified.

In testimony whereof I have signed my name to this specification.

SWENEY MUNSON.